Dec. 12, 1939.                W. C. WALKER                2,183,374
                              FLUID METER
                         Filed Jan. 7, 1938           5 Sheets-Sheet 5

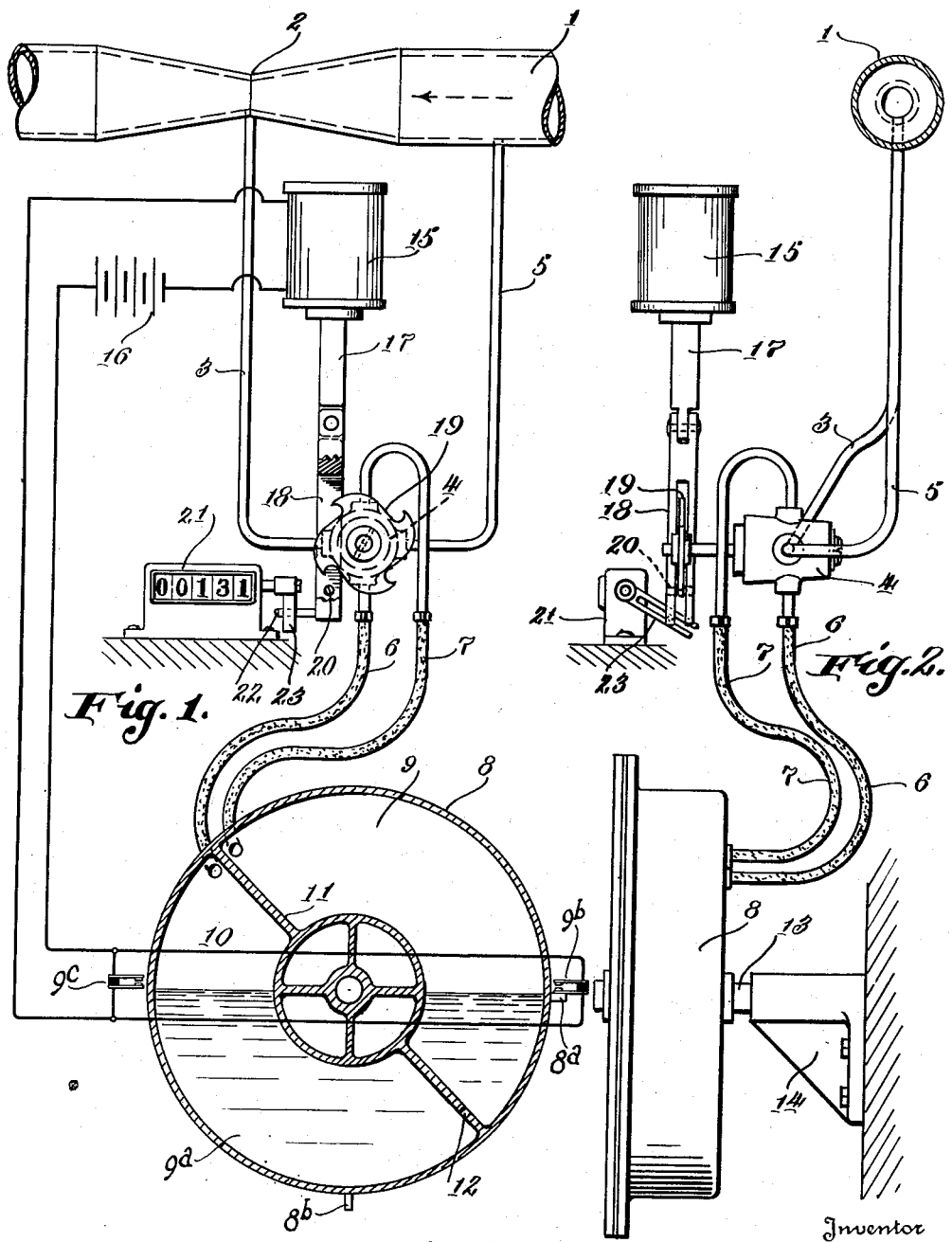

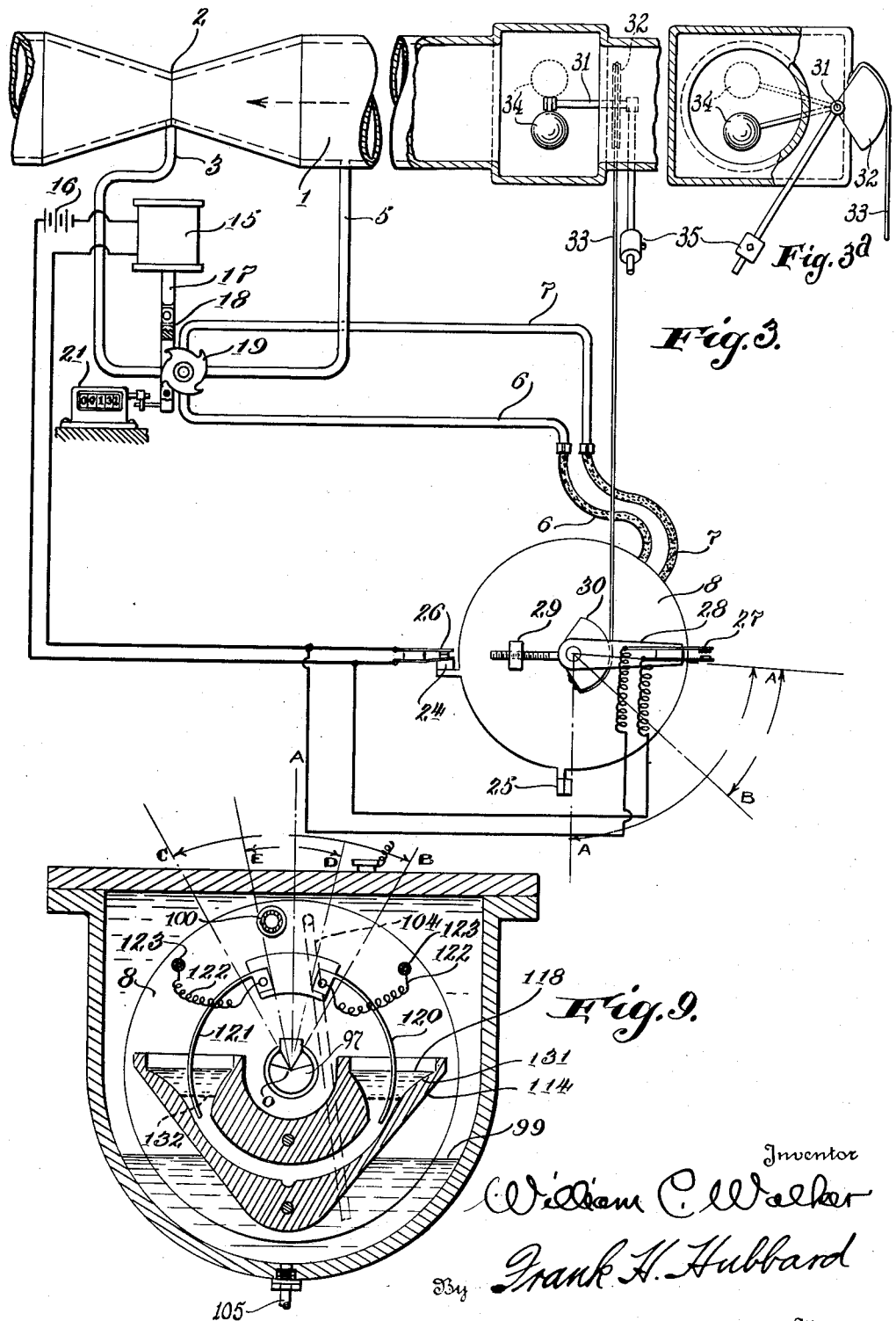

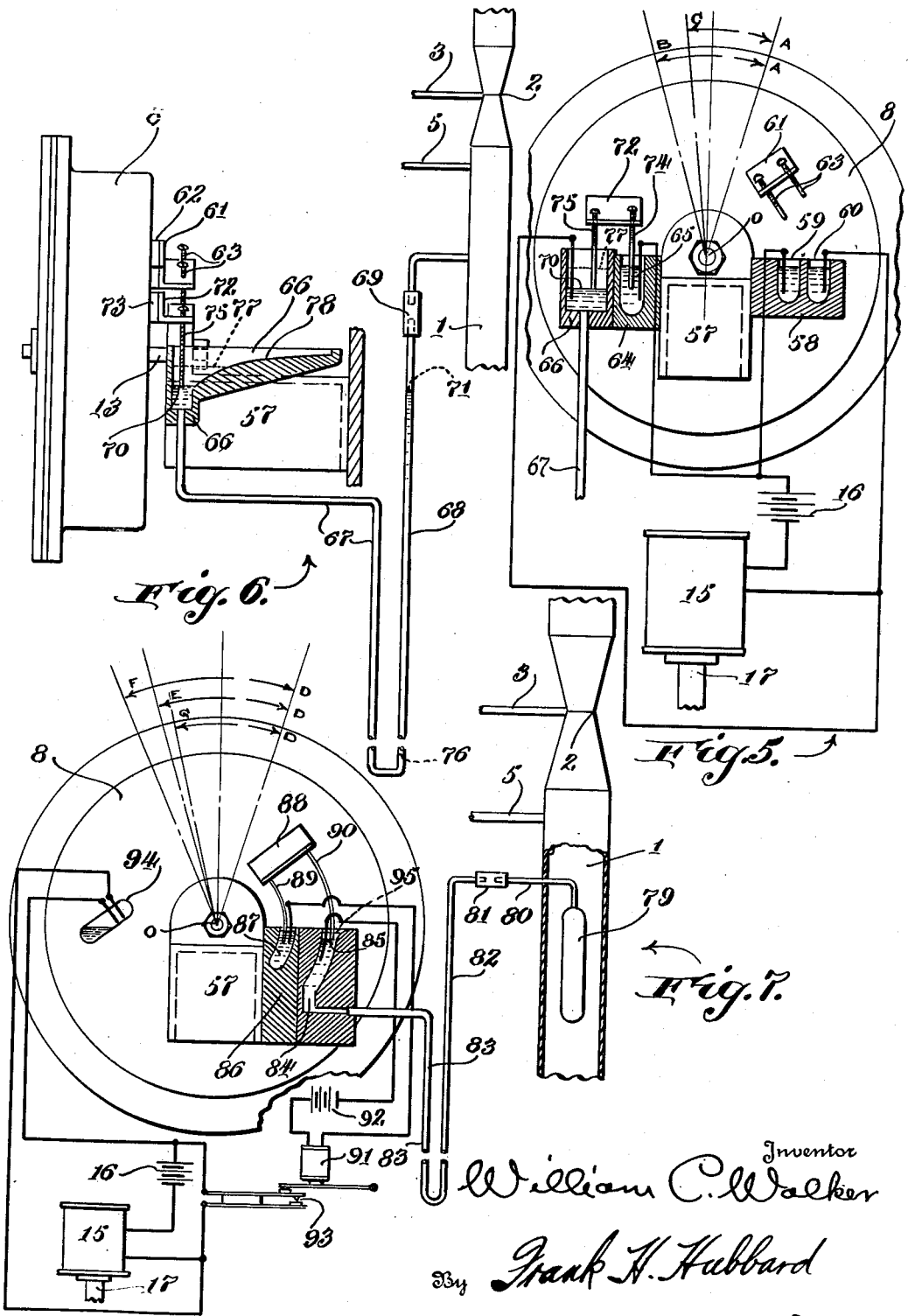

William C. Walker, Inventor

By Frank H. Hubbard
                        Attorney

Patented Dec. 12, 1939

2,183,374

UNITED STATES PATENT OFFICE 2,183,374

FLUID METER

William C. Walker, York, Pa.

Application January 7, 1938, Serial No. 183,765

13 Claims. (Cl. 73—206)

This invention relates to improvements in fluid meters, and more particularly to meters having means to compensate in the meter reading for variations in a characteristic or characteristics of the fluid being metered.

In my Reissue Patent No. 21,012, dated February 21, 1939, I have disclosed a meter for measuring the total or gross volume of a fluid flowing through a conduit in a given time. It is often desirable, however, to measure a quantity of which the gross volume of the fluid is only one of the factors of such quantity.

Thus it may be desired to integrate the total amount of a chemical which is passing through a conduit and dissolved in a fluid, the rate of flow and the concentration of the solution being variable.

In hydro-electric generating stations or the like it may be desired to know the total amount of energy in the water passing through the station—the head of the water and the rate of flow being variable.

In the measurement of compressible gases or vapors it may be desired to know the actual weight of the fluid; that is, the total amount of gas or vapor reduced to standard pressure and temperature.

An object of the invention is to provide a compensating flow meter of imroved form.

Another object of the invention is to provide a flow meter which directly indicates and/or integrates the quantity which it is desired to measure by controlling the response of apparatus such as that disclosed in my aforementioned patent so as to be affected by and in accordance with a factor or factors which affect the quantity to be measured.

The appended drawings are illustrative of several embodiments of my invention as applied to some of the problems aforementioned.

In the drawings, Figure 1 is a front view, and Fig. 2 is a side view of a meter like that disclosed in my aforementioned patent.

Fig. 3 is a schematic and diagrammatic illustration of an embodiment of the present invention for the determination of the weight or quantity of a solute carried in solution through a conduit.

Fig. 3ª illustrates certain details of the apparatus shown in Fig. 3.

Fig. 5 is a schematic and diagrammatic illustration of an embodiment of the invention applied to a meter for indicating the quantity of gas passing through a conduit reduced to a standard pressure.

Fig. 6 is a partial sectional view of the apparatus illustrated in Fig. 5.

Fig. 7 illustrates an embodiment of the invention for measuring the volume of a supply of air, said volume measurement being modified to correspond with standard temperature conditions.

Fig. 9 is a section along lines 9—9 of Fig. 8.

Figure 4:
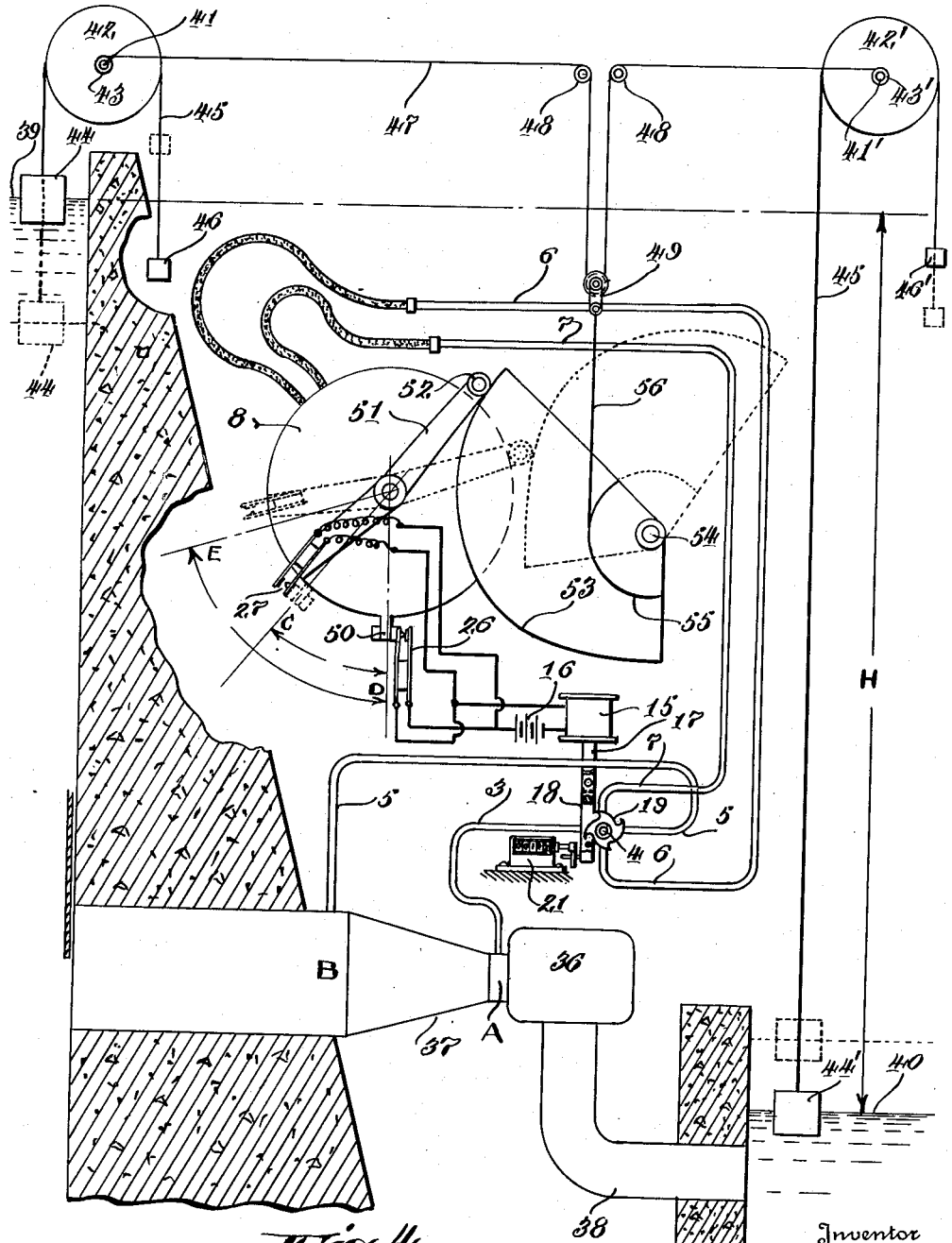
Fig. 4 is a schematic and diagrammatic illustration of an embodiment of my invention for measuring the total value of energy abstracted from the water passing through a turbine.

Referring to Figs. 1 and 2 the meter shown therein is of the type disclosed in my aforementioned patent and is adapted to measure the gross volume of fluid flowing in a conduit 1. A pressure difference due to the flow of the fluid is created in the conduit by means of a Venturi tube. However, said pressure difference may alternatively be produced by a plate orifice, a Pitot tube or any other suitable means. A low pressure conduit 3 leads from a constriction 2 of the Venturi tube to one side of a four-way valve 4 and a high pressure conduit 5 leads from a point of the conduit 1 ahead of the constriction 2 to the other side of said four-way valve. Conduits 6 and 7, respectively, are connected to the four-way valve in such a manner that in one position of said valve conduit 6 is connected with conduit 3 and conduit 7 with conduit 5, while when the valve is rotated through 90 degrees conduit 6 is connected with conduit 5 and conduit 7 is connected with conduit 3. Thus after every 90 degrees of rotation of the valve the relation of the respective outlet and inlet conduits is reversed.

An oscillatable housing 8 is divided into two chambers 9 and 10 by a partition 11 which passes diametrically through the housing, and conduits 6 and 7 lead to these chambers 10 and 9, respectively. The lower portion of the partition 11 is provided with an orifice 12 through which the two chambers communicate with each other. The housing is pivotally mounted on a horizontal axis 13 supported by a bracket 14. A fluid 9ª, which is non-miscible with the fluid to be metered, fills the lower part of the housing to such a height that it covers the orifice 12 at all times.

When the conduit 7 is connected to the main conduit through the high pressure conduit 5 fluid will flow into the chamber 9 and the non-miscible fluid 9ª in the lower section of the chamber is forced out of this chamber through the orifice 12 into the chamber 10, but since the housing is rotatable the level of the fluid 9ª does not drop in the chamber 9 and rise in the chamber 10 but instead maintains an even level in both chambers by causing the housing to rotate in accordance with the passage of fluid 9ª from chamber 9 to chamber 10.

The four-way valve 4 is turned successively through angles of 90 degrees by means of an electromagnet 15 which may be supplied with energy from a source 16. The magnet when energized lifts the armature 17 which is provided with a pivoted stirrup 18 having near its lower end a cross-bar 20 which engages a tooth of a star-wheel 19 rigidly mounted on the stem of the four-way valve 4 and rotates the latter clockwise through 90 degrees upon each energization of the magnet 15. When the current is interrupted the magnet is de-energized, the armature 17 drops and the cross-bar 20 slides under the next tooth of the ratchet wheel 19 to engage and turn the latter upon the next energization of the magnet 15. A counter 21 is operated by a pin 22 fastened to the stirrup 18, which pin engages a fork 23 on the counter. The counter indicates the number of operations of the magnet 15 and thus the number of reversals of the connections of the chambers 9 and 10 through the four-way valve. The magnet circuit is closed through normally open switches 9ᵇ and 9ᶜ which when the housing reaches an extreme position in either direction are engaged by bosses 8ª and 8ᵇ, respectively. The pressure difference existing between the conduits 3 and 5 and therefore between chambers 9 and 10 during movement of the housing 8 in one direction or the other is proportional to the square of the flow of fluid through the conduit 1, while the orifice 12 is so proportioned that the speed of the flow of fluid 9ª therethrough is proportional to the square root of the pressure difference existing between the chambers 9 and 10. As a result the speed with which the fluid 9ª flows through the orifice 12 and therefore the speed with which the housing rotates and the frequency of actuation of the magnet 15 are proportional to the flow of fluid through the conduit 1 so that the counter 21, properly calibrated, directly indicates the gross amount of fluid which has passed through the conduit in a given time.

The apparatus illustrated schematically and diagrammatically in Fig. 3 is an embodiment of the present invention as employed to determine the amount of salt or other soluble substance contained in a solution which passes in a given time through a conduit. To determine the total amount of salt passing through the conduit the apparatus measures the gross volume of the liquid substantially in accordance with the system illustrated and described in connection with Figs. 1 and 2. However, housing 8 does not oscillate through a constant angle but the angle of oscillation is varied in accordance with variations of the specific gravity of the solution which in turn is a function of the concentration of the solution. In other words, a given volume of a highly concentrated solution may carry the same amount of salt as a relatively larger volume of a less concentrated solution. The specific gravity of the solution affects the buoyancy of a float 34 which is adapted to rotate about a pivot 31 and is counterbalanced by a weight 35. The float is mounted in the conduit 1 in such a manner that it is not affected by the varying dynamic head of the flowing solution but responds only to the static head which varies with the degree of concentration. On the shaft 31 is also mounted a suitably shaped cam 32 on which is wound a rope 33 the other end of which is wound on a second cam 30. Cam 30 is mounted concentric with the housing 8 of the meter and carries a switch arm 28 which supports a pair of normally open contacts 27 connected in parallel with a pair of normally open stationary contacts 26. Both pairs of normally open contacts are adapted when closed alternately to complete the circuit of a solenoid 15 the closure taking place when bosses 25 and 24 on the housing 8 abut the contacts, respectively. If the concentration of the solution is of minimum value the float 34 is in its lowest position as shown in the drawings, thus moving switch arm 28 into a horizontal position. As indicated the switch 27 is closed by contact with the boss 25 when the housing has moved from the position shown through an angle of approximately 90 degrees in a counter-clockwise direction. Thus a given amount of solution flowing through the conduit 1 will cause a single oscillation of the housing 8, which oscillation is indicated on the counter 21. If the concentration of the solution increases the float 34 rises causing the switch 27 to turn in a clockwise direction, so that now the oscillation of the housing 8 from the position shown to the position where it operates the switch 27 will be less than 90 degrees. Closure of contacts 27 energizes solenoid 15 which turns valve 4 and reverses the connections of chambers 9 and 10. This causes the housing to revolve in a clockwise direction until the housing 8 returns to the position shown, whereupon abutment 24 closes contacts 26, thus again energizing solenoid 15 and turning valve 4. The cycle is then repeated as aforedescribed. By properly shaping the cams 30 and 32 the angular distance through which the housing 8 oscillates between successive energizations of the magnet 15 may be made such as to correspond to a constant amount of salt for each oscillation, irrespective of the variation in concentration and thus the counter 21 will indicate the total amount of salt carried through the conduit by the solution.

If the density D of the liquid in the conduit 1 varies, due to varying concentration of the solution, the arc of travel of the housing 8 between reversals should vary with $$\frac{1}{\sqrt{D}}$$

if the total weight of solution passing through the conduit for one oscillation of the housing is to be the same for all concentrations. If, further, $p$ is the percentage of solute in the solution, then the arc of oscillation of the housing for constant weight of solute per oscillation should vary with $$\frac{1}{p\sqrt{D}}$$

Hence by properly shaping the cams 30 and 32, in accordance with the known relation between density and concentration of the solution, the total amount of solute passing through the conduit 1 may be indicated.

For example, at 25 degrees C., salt brine of a density of 1.054 carries 8 per cent. by weight of salt. If the housing swing for this density is 90 degrees and during one oscillation 12,500 lbs. of brine passes through the conduit, the amount of salt is 12,500×.08 or 1,000 lbs. and the counter 21 will indicate in multiples of 1,000. If now the density changes to 1.114, corresponding to 16 percent. of salt in solution, the proper arc travel to record 1,000 lbs. of salt per oscillation is $$\frac{90 \text{ degrees}}{\frac{16}{8}\sqrt{\frac{1.114}{1.054}}} = 43.6 \text{ degrees}$$

By properly relating the position of the float 34 corresponding to different densities of the fluid and the required housing travel for the corresponding concentration, the required shape of the cams 30 and 32 may be determined graphically or by calculation.

Fig. 4 illustrates a form of the invention adapted to determine the total value of energy abstracted from a stream of water flowing through a hydraulic turbine 36. In this system the volume of the water flowing through the turbine is determined in the manner described in connection with Fig. 1, but the angular oscillation of the meter housing is varied in accordance with variations in the net head; that is, the difference between the level of the water in the forebay and in the tail race.

Water is supplied to the turbine under pressure through a conduit 37 while the discharge is through a channel 38. The difference between the water level 39 in the forebay and the water level 40 in the tail race is H. The energy given up by the water in passing through the turbine plant is equal to its weight multiplied by the head H, and the efficiency of the plant can be calculated from this by dividing the energy delivered by the turbine, by the energy abstracted from the water. As the water passes from the larger cross section B of the conduit 37 to the restricted cross section A, a portion of the static head is converted into kinetic energy so that a lower static pressure obtains at the point A than at the point B. The value of this pressure difference multiplied by the constant of the restriction is the total amount of water flowing in the conduit 37. A high pressure conduit 5 and a low pressure conduit 3 connect the sections B and A respectively of the conduit 37 to the four-way valve 4 of a meter similar to that shown and described in connection with Fig. 1. A normally open switch 27 controlling the energy to the solenoid 15 is carried on one arm of a lever 51 concentric with the pivot of the housing 8. The other arm of the lever 51 is provided with a roller 52 which engages a cam 53 pivoted at 54. Floats 44, 44¹ attached to pulleys 42, 42¹ are arranged to follow the level 39 of the forebay and of the tail race 40, respectively. The pulleys 42, 42¹ are pivoted at 41, 41¹ and are provided with counterweights 46, 46¹ which nearly balance the weights of the floats 44, 44¹. The shafts 41, 41¹ each carry a second pulley 43, 43¹ on which are wound the respective ends of a rope or cable 47. Rope 47 is further guided over suitable guide pulleys 48, 48 so as to form an intermediate loop which supports a loose pulley 49 which in turn is fastened to a rope or cable 56 wound around a cam or pulley 55 fastened to a pivoted shaft 54 to which is fastened a cam 53.

It will be seen that if the water level of either the forebay or of the tail race changes, so as to produce a change in H, pulley 49 moves up or down depending upon the direction of the change, thereby rotating the cam 53 which engages the roller 52 in such a manner as to change the angular position of the switch 27 which is operated by a boss 50 on the housing 8. Thus the housing is oscillated through a varying angle which varies inversely as the net head H of the water flowing through the turbine. By properly shaping the cam 53 the angular oscillation of the housing is varied in accordance with the net head of the water while the speed of rotation of the housing is a function of the flow of water passing through the conduit 57. The counter 21 which counts the total oscillations of the housing therefore indicates the total amount of energy given up by the water in its flow through the plant.

In designing the cam 53 which determines the position of the switch 27 consideration must be given to the fact that as aforesaid the total energy in the water is equal to the volume multiplied by the head H, therefore the frequency of oscillation of the housing 8 should change directly as the net head H. As the angular speed of the housing 8 remains constant for a constant volume and therefore a constant pressure difference in the turbine conduit, the angular travel of the housing should be varied inversely as the variations of H. This can readily be done by shaping the cam 53 to produce this reciprocal relation.

If, for example, H is 90 feet, the pulley block 49 is moved to such a position by the floats that the switch 27 is actuated for instance when the arc of travel of the housing 8 is 40 degrees between the fixed reversal point 26 to the right and the variable reversal point determined by the position of the switch 27 to the left. If during the period of a single oscillation 111,000 lbs. of water pass through the channel 37 the counter 21 is calibrated so as to indicate an energy equal to 111,000×90 or ten million ft. lbs. of energy and the counter 21 indicates the total energy in terms of multiples of ten million ft. lbs., regardless of the amount of water flowing. The condition aforediscussed as indicated in Fig. 4, corresponds to a travel of the housing between reversals for such condition equal to the angle C—D.

If now H should be reduced to 50 ft. the arc of housing travel must be altered so that the counter continues to indicate in multiples of ten million ft. lbs. As the arc of travel must be inversely proportional to H we find that for the new condition the arc must be 9/5 of the former arc of 40 degrees, or 72 degrees, or E—D as indicated in dotted lines in the drawing.

In a similar manner the arc of oscillation can be determined for all values of H and the cam 53 formed in accordance therewith.

While the embodiment shown in Fig. 4 shows one way of varying the arc of oscillation of the housing in accordance with variations in the net head of water, any other well known means may be employed without departing from the spirit of the invention.

Figures 5, 6 and 7 show an adaptation of the invention for adjusting the arc housing travel of the meter to compensate for variations in pressure and temperature in the fluid to be metered.

If P is the absolute standard pressure at which it is desired to indicate the volumes measured by the meter, and if P¹ represents the actual absolute pressure of the fluid, the volume corresponding to the absolute standard pressure P is obtained from the actual volume at absolute pressure P¹ by multiplying the actual volume by the ratio $$\frac{\sqrt{P^1}}{\sqrt{P}}$$

The embodiment of my invention illustrated in Fig. 5 applies this correction of the readings to the counter illustrated in Figs. 1 and 2 so that the counter indicates directly the volume of the fluid reduced to the desired absolute standard pressure. The correction is obtained by varying the arc through which the housing oscillates.

The housing 8 oscillates on a shaft 13 mounted on a bracket 57. Attached to this bracket is a block of insulating material 58 which contains two mercury pools 59 and 60 respectively, which pools are insulated from each other. Contact points 63 are mounted on a bracket 61 which in turn is attached to but insulated from the housing 8 by means of an insulating block 62. The contact points 63 are connected with each other and are adjustable. As the housing 8 rotates in a clockwise direction to a position indicated by arc O—A the contact points 63 complete a circuit between the pools 59 and 60, thereby completing the circuit for the solenoid 15 and energizing the latter. As previously described when the solenoid 15 is energized it turns the four-way valve through 90 degrees thus reversing the pressure conditions to which the respective chambers of the housing are subjected and the direction of rotation of the latter. On the side of bracket 57 opposite to that to which insulating block 58 is attached is an insulating block 64 containing a mercury pool 65. There is also attached to the block 64 a receptacle 66 the bottom of which is connected with a pipe 67 forming one leg of a manometer. The other leg 68 of the manometer is connected through an insulating connection 69 and the fluid conduit 1.

The manometer is filled with mercury to an extent such that when the pressure in conduit 1 is equal to atmospheric pressure the mercury in receptacle 66 will be at level 70 and of course at the same level marked 71 in leg 68. A bracket 72 is mounted to and insulated from the housing 8 by means of an insulating block 73. The bracket 72 supports adjustable contact points 74 and 75 which are conductively connected with each other. When the housing rotates in a counter-clockwise direction until its central radial axis has reached the position O—B of Fig. 5, contact is established between the mercury pools 65 and 66 and thus the circuit of the solenoid 15 is closed to reverse the pressure conditions in the chambers of the housing and the direction of rotation of the same. Since the pressure in the fluid conduit 1 is equal to atmospheric pressure the housing swings back and forth through an arc A—B, the rate of oscillation being directly proportional to the volume of the fluid passing through conduit 1 and the instrument indicates the volume of the flow in terms of atmospheric pressure.

If now the pressure in the conduit 1 increases so that the mercury in leg 68 falls to a level indicated by 76 and rises a corresponding amount in receptacle 66 to the level indicated by 77 the vertical distance between 71 and 76 plus that between 70 and 77 represents the pressure increase above atmosphere in height of the mercury column. If now the housing rotates in a counter-clockwise direction the circuit between the mercury pool 65 and the mercury pool in receptacle 66 is completed when the housing is in the position indicated by O—C and as long as this pressure condition exists in the conduit 1 the reversal of the housing takes place at O—C. The inside contour of receptacle 66, indicated by 78, is such that as the pressure in the conduit rises and falls the point at which the housing is reversed at the end of its counter-clockwise swing is advanced or retarded so that the arc of swing is automatically adjusted and the counter at all times indicates the volume of fluid reduced to the desired standard absolute pressure. If the pressure in conduit 1 falls below atmosphere the mercury level in receptacle 66 falls below the level 70 and the length of arc becomes greater than the arc A—B obtaining for atmospheric pressure in the conduit 1.

It is of course obvious that the mercury pool contacts 59 and 60 may be replaced by a tilting mercury switch, or other type of switch, such, for instance, as the mercury switch 94 shown at the left of Fig. 7. It will also be apparent that means for adjusting for pressure variations other than that just described may be employed. For instance, any of the well known means for recording pressure by gauges or charts to shift the contacts for completing the circuit of the solenoid 15, and thus varying the arc of travel of the housing 8, may be employed.

In Fig. 7 is illustrated a means for varying the arc of oscillation of the housing in accordance with temperature variations of the fluid passing through the meter. If $T^1$ is the actual temperature of the fluid whose flow is being measured and T is the standard absolute temperature for which the meter is to indicate the volume of the fluid flow and the housing is calibrated for the temperature T it is necessary to modify the arc of oscillation of the housing by the ratio $$\frac{\sqrt{T^1}}{\sqrt{T}}$$

to obtain correct indications of the meter for varying temperatures. Automatic means are therefore provided for varying the housing swing to a degree proportional to the ratio $$\frac{\sqrt{T^1}}{\sqrt{T}}$$

that is, to reduce the readings to a volume corresponding to the standard temperature T.

In the drawings 79 is a sealed bulb placed in intimate contact with the fluid flowing in the conduit 1 so that the temperature of the fluid in the bulb 79 is always substantially that of the fluid passing through the conduit 1. The bulb 79 should be so located with respect to the conduits 3 and 5 that it does not produce eddy currents in the flow of the fluid to be measured and thereby decrease the accuracy of the meter. Hence it should be placed at a relatively great distance from the constriction 2. Attached to the bulb 79 is a capillary tube 80 which connects the bulb by means of an electrically insulating coupling 81 to a manometer leg 82. The second leg 83 of the manometer is connected to a mercury pool 84 which is supported from the bracket 57 by an insulating block 86. The bulb 79 is filled with a gas or vapor which is sealed off by a second fluid such as mercury contained in the manometer consisting of the legs 82 and 83. As the temperature of the fluid passing through the conduit 1 and consequently the temperature of the bulb 79 increases the pressure in the latter increases and forces the mercury down the leg 82 and raises the level of the mercury in pool 84. The amount of mercury in the pool 84 and manometer 82, 83 is adjusted so that for standard temperature T the mercury level in pool 84 is at the level indicated at 85.

The insulating block 86 contains a second mercury pool 87. A bracket 88 is insulatingly attached to the housing 8 and carries electrical contact pins 89 and 90, connected with each other and adapted to dip into the pools 84 and 87. The contact pin 89 is always in contact with the mercury in pool 87 but contact pin 90 is so arranged that as the housing rotates in a counter-clockwise direction the pin breaks circuit with the mercury in pool 84 when the vertical radial axis of the housing has reached the position indicated by O—E.

Relay coil 91 is supplied with energy from the source 92 over lines terminating in pools 84 and 87. Hence the relay is energized as long as the pin 90 is in contact with the mercury in pool 84. The relay aforementioned is provided with normally open contacts 93. When the relay is de-energized contacts 93 are closed thereby energizing solenoid 15 which operates the reversing valve for the conduits 3 and 5 in the manner aforedescribed. Hence when the housing in its counter-clockwise rotation reaches the position indicated in Fig. 7 the magnet circuit for relay 91 is opened and as a result the magnet coil 15 is energized and the connections of the housing relative to the conduit 1 are reversed and the housing is caused to rotate in a clockwise direction. A mercury contact switch 94 is also mounted on the housing and arranged in such a manner that when the center line of the housing reaches the position O—D, the switch 94 closes a circuit for energizing the magnet 15 which then again operates the reversing valve and causes reversal of the housing movement in a counter-clockwise direction.

If the temperature of the fluid in the conduit 1 increases the fluid trapped in the bulb 79 expands thereby forcing mercury from the leg 82 and into the pool 84 thereby raising its level and retarding opening of the circuit of relay coil 91 so that the housing must swing through a larger arc, as, for instance, to position O—F before it is reversed, whereas, if the temperature of the fluid in conduit 1 decreases below the standard temperature T the liquid level in pool 84 drops below the level 85 as a result of which the arc of oscillation of the housing 8 is decreased as indicated by D—G in the drawings. The inner contour of the pool 84 is shaped so that the level corresponding to varying temperature causes the arc of travel to vary as the ratio $$\frac{\sqrt{T^1}}{\sqrt{T}}$$

and thus the counter 21 accurately indicates the volume of the fluid passing through the conduit 1 at standard temperature T. It is obvious that other means may be employed to vary the arc of travel of the housing 8 in response to variations of temperature of the fluid to be metered.

Figure 10:
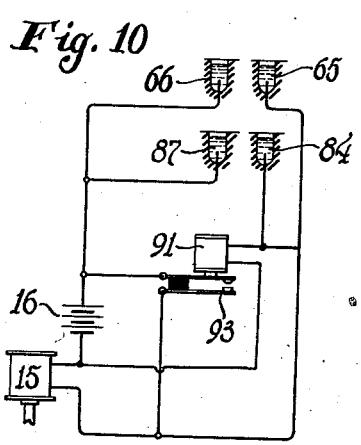
Fig. 10 is a connection diagram of another embodiment of the invention for measuring a flow of gas through a conduit.

It is also obvious that the arrangement shown in Fig. 5 and described in connection therewith; that is, the compensation of the meter for varying pressures, and the arrangement just described for compensating the meter for varying temperatures of the fluid to be metered may be combined in one instrument so as to correct the readings simultaneously for the two standard conditions of temperature and pressure. This may be accomplished, for instance, by omitting the mercury switch in the apparatus illustrated in Fig. 7 and mounting mecury receptacles 64 and 66, as shown in Figs. 5 and 6, on the right hand side of bracket 57 (Fig. 7), together with the other elements 64 to 78, shown in Figs. 5 and 6, cooperating with said receptacles. Fig. 10 illustrates the connections of the electrical circuits. As aforedescribed, if the pressure in conduit 1 now varies, the circuit for magnet 15 which is closed between the mercury in 65 and 66 is established at a correspondingly variable point in the clockwise rotation of the housing and thus the swing of the housing is varied. On the other hand, the rotation of the housing in counter-clockwise direction is varied in accordance with temperature by opening of the circuit between mercury pools 84 and 87. Thus the total swing of the housing varies with temperature and pressure of the fluid in conduit 1 and the meter readings are corrected for temperature and pressure.

Figure 8:
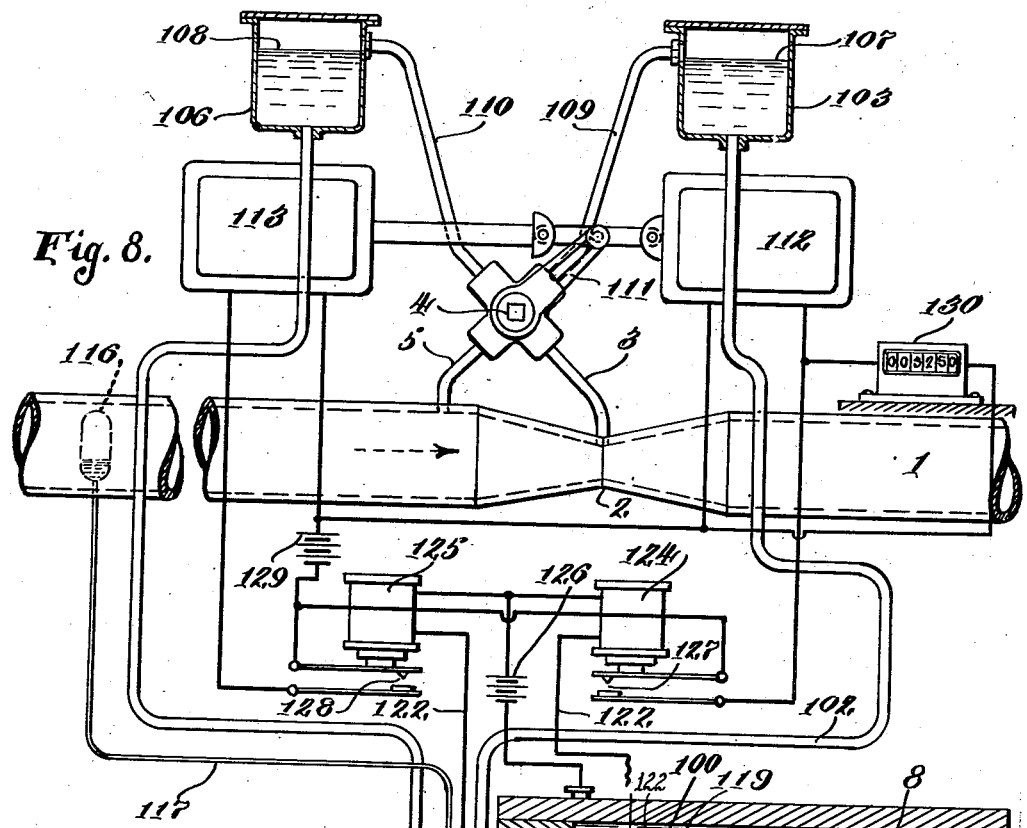
Fig. 8 is a partial sectional view of an embodiment of the invention for the measurement of steam, the readings being modified to correspond with standard density conditions.

The means for compensating for varying temperature and pressure which have been described heretofore are suitable for ideal gases whose temperature and pressure characteristics may be ascertained. In the case of vapors, however, there is a departure from the ideal relation existing between pressure and temperature of a gas. The device now to be described is directed toward the compensation for varying density of gas or vapor when the characteristics thereof are not known. Referring to Figs. 8 and 9 the housing 8 is constructed generally as described heretofore. The partition of the housing is provided with an orifice 12 which connects the two chambers. The housing is supported from two knife edges 96 which in turn are supported by a stationary shaft 97, rigidly attached to a wall of a pressure-tight casing 98. The casing 98 is filled with a liquid such as water to approximately the level indicated at 99 and a second liquid non-miscible with the first, such as transformer oil, is poured over the first so as to substantially fill the entire casing 98. The lower portion of the housing 8 is filled as aforedescribed with a heavier liquid such as mercury. To the left-hand chamber of housing 8 is connected a tube 100 the free end of which rotates freely in a counterbore 101 in the casing 98 concentric with the shaft 97. A conduit 102 connects the counterbore 101 with the bottom of a closed vessel 103. The right-hand chamber of the housing 8 is provided with a conduit 104 the free end of said conduit being arranged so as to always dip into the water filling the lower portion of the casing 98. A conduit 105 leads from the lower portion of the casing 98 to the bottom of a closed vessel 106. It will be apparent that the pressure in the vessel 106 will always be communicated to the right hand chamber of the housing 8 while the pressure in the vessel 103 will always be communicated to the left hand chamber of the housing 8.

The vessels 103 and 106 as well as the conduits 102 and 105 are always filled with water,— the level of the water being at 108 and 107 in the vessels 106 and 103 respectively. The free spaces above the water level in the vessels 103 and 106 are occupied by a vapor. They communicate through conduits 109 and 110 respectively with the two inlet ports of the four-way valve 4, the two outlet ports of which are connected to the branch conduits 3 and 5 of the main conduit 1 in the manner aforedescribed. The four-way valve 4 is operated by a lever arm 111 connected by suitable links to the armatures of two solenoids 112 and 113 which solenoids may be alternately energized. When the solenoid 113 is energized it turns the four-way valve 90 degrees in a counter-clockwise direction while energization of solenoid 112 turns the valve in a clockwise direction. As previously described the reversal of the four-way valve reverses the relation between conduits 3 and 5 and 109 and 110 respectively. A substantially U-shaped mercury cup 114 is rigidly attached to the inside of the U-shaped casing 98, the lower portion of the U-shaped channel being connected through a capillary tube 115, 117 to a bulb 116 arranged in the main conduit 1. The space above the mercury in the bulb 116 is occupied by the vapor of a fluid of substantially the same character as the fluid in the conduit 1.

It will be seen that the steam or vapor pressures existing in the conduit 1 are transmitted through the conduits 3 and 110, the vessel 106, conduit 105, the liquids in the casing 98, mercury cup 114, capillary tube 117 to the vapor in the space above the mercury in bulb 116 so that this vapor will always be at the same pressure as the vapor flowing in the conduit 1. At the same time the temperature of the vapor flowing in conduit 1 is transmitted through the wall of the bulb 116 to the vapor contained in the bulb. Hence the vapor in the bulb is at the same temperature and pressure as the steam or vapor surrounding the bulb and has therefore the same density as the latter. The volume of the vapor in the bulb therefore changes with variations in the density of the surrounding steam or vapor as the densities of the two vapor bodies must remain the same at the same temperature. Any change in the volume of the vapor (such as steam) in the bulb 116 causes mercury to be transferred between the bulb 116 and the cup 114. This alters the level 118 of the mercury in cup 114 which latter therefore varies in accordance with the density of the steam or other vapor flowing through the conduit 1. An insulating block 119 supports contact pins 120 and 121 from the housing 8. In the position shown in Fig. 9 both of these pins make contact with the mercury in the cup 114 and thus are electrically connected directly with the casing 98. As long as the pins are thus connected to the casing a circuit is closed through the relays 124 and 125 which are supplied with energy from a source 126, one pole of which is connected to the housing 98 while the other pole is connected to the common terminal of the relays 124 and 125. The other terminals of the relays are connected respectively to the pins 120 and 121. As long as the relays 124 and 125 are energized the normally closed contacts 127, 128, respectively, of the relays are open. However, if by opening of the circuit between pin 120 or 121 and the mercury in the cup 114 the corresponding relay is de-energized, the magnet 112 or 113, respectively, is energized and actuates the reversing valve 4 to reverse the connections between the branch conduits 3 and 5 and 109 and 110, respectively.

In the position shown in Fig. 8 the four-way valve connects the high pressure of the constriction 2 to the left-hand chamber of housing 8 and the low pressure to the right-hand chamber. This causes the housing to rotate clockwise until contact is broken between the pin 121 and the mercury in the cup 114 at the moment when the central axis O—A (Fig. 9) of the housing 8 has reached the position O—B. This causes de-energization of the relay coil 125 thereby closing contact 128 and energizing solenoid 113 from the source of energy 129. The solenoid 113 rotates the four-way valve 90 degrees and this reverses the pressure conditions in the housing 8 and causes the latter to start rotation in a counter-clockwise direction. As soon as contact between contact point 121 and the mercury in cup 114 is re-established the solenoid 113 is de-energized. The housing 8 continues to rotate counter-clockwise until contact is broken by the pin 120 and relay 124 is de-energized causing closure of contact 127 and energization of solenoid 112 again reversing the direction of rotation of the housing 8. This cycle continues at a rate of oscillation proportional to the flow of fluid through the conduit 1, while the level of the mercury in the cup 114 remains at 118 as long as the density of the steam or vapor does not vary, and therefore the arc of travel of the housing 8 between alternations will be the arc B—C. The oil above the water level in the casing 98 provides for insulation of the contact points 120 and 121 from the casing except when they are in metallic contact with the mercury in the cup 114.

An electromagnetically operated counter 130 has its energizing circuit connected in parallel circuit with the solenoid 112 so that it advances one unit or step each time the solenoid is energized. The counter 130 therefore indicates the total number of complete oscillations of the housing 8. It is desirable that the counter indicate the total amount of steam or vapor flowing through conduit 1 by weight. In order to do this the arc travel of the housing is controlled by the density of the steam so that for a complete oscillation of the housing a definite weight of steam passes through the constriction tube irrespective of varying temperature and pressure of the steam.

It is known that in a flow meter of the pressure differential type the relation between the weight of the fluid passing through a constriction, the density and the pressure difference between the upstream and downstream pressure of the constriction may be expressed by the equation $$W = K\sqrt{DH}$$

Where W is the weight of fluid in unit time; H is the pressure differential; D is the density of the fluid in weight per unit volume, and K is a constant containing the dimensional characteristics of the orifice, the density of the liquid measuring the pressure, etc.

As fully disclosed in my Reissue Patent No. 21,012, aforementioned, the rate of oscillation of the housing 8 is proportional to the square root of the pressure differential between the two chambers. If the arc travel of the housing 8 remained constant and it would be desired to compensate for variations in D, the counter readings would have to be corrected by multiplying them by the square root of D. To avoid this calculation the arc of housing travel may be varied inversely as the square root of D. If this is done a definite unit of weight of steam passes through the constriction 2 for each complete cycle of housing oscillation and therefore the counter 130 will register the total weight of flow regardless of variations of D and H. This is accomplished by shaping the inner contour of cup 114 as indicated at 131 so that the mercury level 118 varies and causes opening of circuit with pins 120 and 121, respectively, at an angular rotation of the housing from its center position varying with the density D so that the arc of housing travel will always be inversely proportional to $$\sqrt{D}$$

Suppose for example, that the quantity of steam in bulb 116 is such that for 30 lbs. absolute steam pressure the level in cup 114 is at 118. Then the contacts 120 and 121, respectively, will break circuit with the mercury upon a swing of the housing 8 through an arc equal to B—C, or about 60 degrees. If now the steam pressure should increase to 192 lbs. absolute, the volume in bulb 116 above the mercury is reduced from that obtaining at 30 lbs. and mercury flows from cup 114 into the bulb 116. The amount of mercury so withdrawn from cup 114 can easily be calculated from available steam tables. Cup 114 is therefore so shaped, that the arc of travel of the housing between reversals is correspondingly reduced to that indicated by D—E. The density of steam at 30 lbs. absolute is .073 lb. per cu. ft., while that of steam at 192 lbs. is .42 lb. per cu. ft. It follows that the ratio of the arc D—E to the arc B—C must be as to $$\frac{\sqrt{.073}}{\sqrt{.42}}$$

and therefore the arc D—E is approximately 25 degrees. The shape of cup 114 is therefore made such that similar relations between arc travel and pressure obtain for all pressures encountered.

If the steam in conduits 1 is saturated, a few drops of water should be introduced into bulb 116, so that the steam therein is also saturated. If the steam in conduit 1 is always superheated, no water is put into bulb 116. In that case the shape of cup 114 is designed in accordance with the well known relation between the density and volume of superheated steam for different temperatures and pressures. Any inert gas or vapor whose relations of density and volume to pressure and temperature are known, may be substituted for the steam in the bulb 116.

What I claim as new and desire to secure by Letters Patent is:

1. A fluid meter comprising means to produce a pressure difference as a predetermined function of the flow of fluid being metered, a housing, an auxiliary fluid in said housing, a measuring restriction located in said housing, means to transmit an effect of said pressure difference to said auxiliary fluid at opposite sides of said restriction, means for reversing said transmitting means relative to said restriction, and means to actuate said reversing means after a given volume of auxiliary fluid has passed through the restriction, said last mentioned means including means to vary said given volume in accordance with the variation of a characteristic of the fluid to be metered.

2. A fluid meter comprising means to produce a pressure difference as a predetermined function of the flow of fluid being metered, a housing, an auxiliary fluid in said housing, a measuring restriction located in said housing, means to transmit an effect of said pressure difference to said auxiliary fluid at opposite sides of said restriction, means for reversing said transmitting means relative to said restriction, and means to actuate said reversing means after a given volume of auxiliary fluid has passed through the restriction, said last mentioned means including means to vary said given volume in accordance with the variation in temperature of the fluid to be metered.

3. A fluid meter comprising means to produce a pressure difference as a predetermined function of the flow of fluid being metered, a housing, an auxiliary fluid in said housing, a measuring restriction located in said housing, means to transmit an effect of said pressure difference to said auxiliary fluid at opposite sides of said restriction, means for reversing said transmitting means relative to said restriction, and means to actuate said reversing means after a given volume of auxiliary fluid has passed through the restriction, said last mentioned means including means to vary said given volume in accordance with the variation of the pressure of the fluid to be metered.

4. In a flow meter, an oscillatable housing, conduits in communication with said housing, pressure responsive means within said housing whereby a pressure differential in said conduits will cause a rotation of said housing, auxiliary power means responsive to a predetermined movement of said housing for reversing said pressure differential in said conduits after said housing has been moved through a predetermined angular distance, and means to vary said predetermined angular distance in accordance with variations of a characteristic of the fluid to be metered.

5. In a flow meter, an oscillatable housing, conduits in communication with said housing, pressure responsive means within said housing whereby a pressure differential in said conduits will cause a rotation of said housing, auxiliary power means responsive to a predetermined movement of said housing for reversing said pressure differential in said conduits after said housing has been moved through a predetermined angular distance, and means to vary said predetermined angular distance in accordance with variations of the temperature of the fluid to be metered.

6. In a flow meter, an oscillatable housing, conduits in communication with said housing, pressure responsive means within said housing whereby a pressure differential in said conduits will cause a rotation of said housing, auxiliary power means responsive to a predetermined movement of said housing for reversing said pressure differential in said conduits after said housing has been moved through a predetermined angular distance, and means to vary said predetermined angular distance in accordance with variations of the pressure of the fluid to be metered.

7. A fluid meter comprising means to produce a pressure difference as a function of the flow of fluid being metered, said pressure difference being proportional to the square of the rate of such flow, two chambers, means to pass the high and the low pressures of said pressure difference alternately to each chamber at a rate of alternation proportional to the square root of said pressure difference, means to vary the proportionality between said pressure difference and said rate of alternation in accordance with the variation of a characteristic of the fluid to be metered, and means responsive to said rate of alternation to indicate the volume of the fluid flow.

8. A fluid meter comprising means to produce a pressure difference as a function of the flow of fluid be'ng metered, said pressure difference being proportional to the square of the rate of such flow, two chambers, means to pass the high and the low pressures of said pressure difference alternately to each chamber at a rate of alternation proportional to the square root of said pressure difference, and means to vary the proportionality between said pressure difference and said rate of alternation in accordance with the variation of the pressure of the fluid to be metered.

9. A fluid meter comprising means to produce a pressure difference as a function of the flow of fluid being metered, said pressure difference being proportional to the square of the rate of such flow, two chambers, means to pass the high and the low pressures of said pressure difference alternately to each chamber at a rate of alternation proportional to the square root of said pressure difference, and means to vary the proportionality between said pressure difference and said rate of alternation in accordance with the variation of the temperature of the fluid to be metered.

10. A fluid meter comprising means to obtain a pressure difference resulting from the flow of fluid being metered, said pressure difference being proportional to the square of the rate of such flow, two chambers, means to subject said chambers simultaneously to the high and low pressure effects of said pressure difference alternately at a rate of alternation proportional to the square root of said pressure difference, means to vary the proportionality between said pressure difference and said rate of alternation in accordance with the variations of a characteristic of the fluid to be metered, means operable in response to each alternation, and means operable by said last mentioned means to continuously indicate the total volume of the fluid flow.

11. A fluid meter comprising means to obtain a pressure difference resulting from the flow of fluid being metered, said pressure difference being proportional to the square of the rate of such flow, two chambers, means to subject said chambers simultaneously to the high and lower pressure effects of said pressure difference alternately at a rate of alternation proportional to the square root of said pressure difference, means to vary the proportionality between said pressure difference and said rate of alternation in accordance with the variations of the pressure of the fluid to be metered, means operable in response to each alternation, and means operable by said last mentioned means to continuously indicate the total volume of the fluid flow.

12. A fluid meter comprising means to obtain a pressure difference resulting from the flow of fluid being metered, said pressure difference being proportional to the square of the rate of such flow, two chambers, means to subject said chambers simultaneously to the high and low pressure effects of said pressure difference alternately at a rate of alternation proportional to the square root of said pressure difference, means to vary the proportionality between said pressure difference and said rate of alternation in accordance with the variations of the temperature of the fluid to be metered, means operable in response to each alternation, and means operable by said last mentioned means to continuously indicate the total volume of the fluid flow.

13. A fluid meter comprising means to obtain a pressure difference resulting from the flow of fluid being metered, said pressure difference being proportional to the square of the rate of such flow, two chambers, means to subject said chambers simultaneously to the high and low pressure effects of said pressure difference alternately at a rate of alternation proportional to the square root of said pressure difference, means to vary the proportionality between said pressure difference and said rate of alternation in accordance with the variations of the temperature and pressure of the fluid to be metered, means operable in response to each alternation, and means operable by said last mentioned means to continuously indicate the total volume of the fluid flow.

WILLIAM C. WALKER.